United States Patent [19]

Jeffords et al.

[11] Patent Number: 4,950,018

[45] Date of Patent: Aug. 21, 1990

[54] LATCH FOR COMBINATION VENT AND ESCAPE HATCH

[76] Inventors: Austin K. Jeffords; Cris G. Cornelius, both of Rte. 2 Box 2150, Nashville, Ga. 31639

[21] Appl. No.: 456,954

[22] Filed: Dec. 26, 1989

[51] Int. Cl.⁵ .............................................. E05C 17/30
[52] U.S. Cl. ................................ 292/6; 292/DIG. 69; 292/341.16; 292/262; 292/16; 49/141; 49/146
[58] Field of Search ............... 292/DIG. 69, 6, 341.16, 292/75, 338, 262; 52/302; 49/141, 146, 405

[56]  References Cited

U.S. PATENT DOCUMENTS

| | | | |
|---|---|---|---|
| 2,631,032 | 3/1953 | Denker et al. | 292/16 X |
| 3,092,881 | 6/1963 | Vorel, Sr. | 292/341.16 X |
| 4,021,073 | 5/1977 | Manning | 49/141 X |
| 4,412,404 | 11/1983 | Manning | 49/141 X |
| 4,433,506 | 2/1984 | Manning | 49/141 |
| 4,519,645 | 5/1985 | Kelly et al. | 292/224 |

Primary Examiner—Richard E. Moore
Attorney, Agent, or Firm—Harry I. Leon

[57] ABSTRACT

A latch for a combination vent and escape hatch for buses and mobile homes. The latch can be used to hold the hatch door in a closed position that is rain-tight. Alternately, with just a push on the hatch door, it can be opened to a vent position and held there by the latch. When the user pushes on a release mechanism, the hatch door can be opened completely to allow an emergency exit from the vehicle. In addition, a release handle located on the outside of the hatch allows rescue workers to gain easy access.

6 Claims, 3 Drawing Sheets

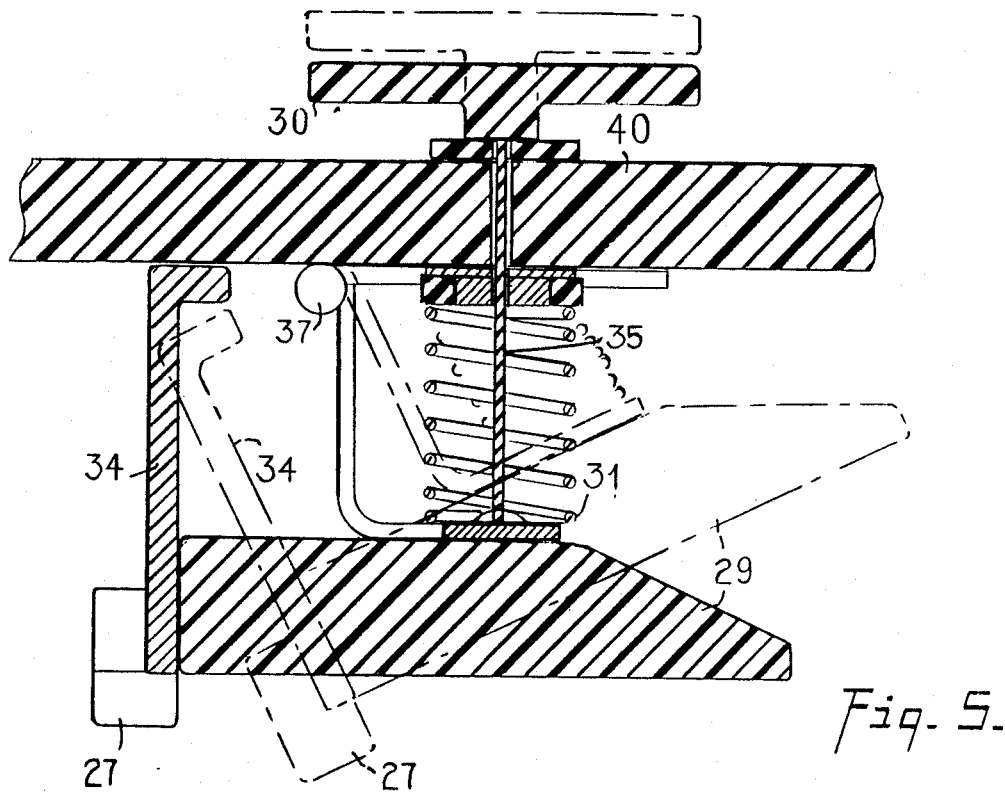
Fig. 5.
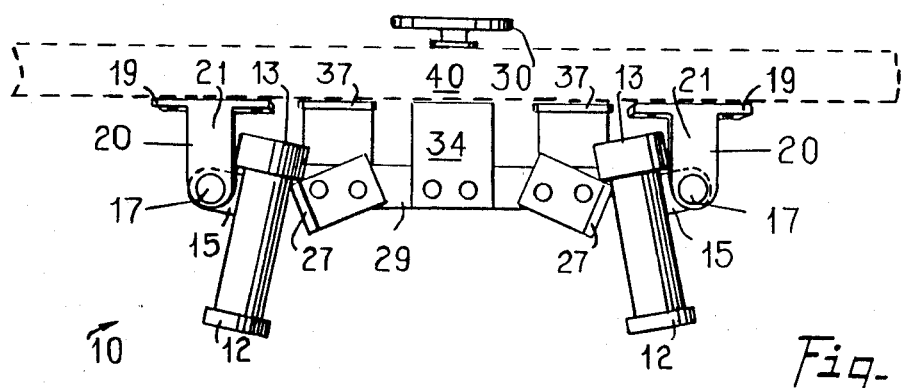
Fig. 4.
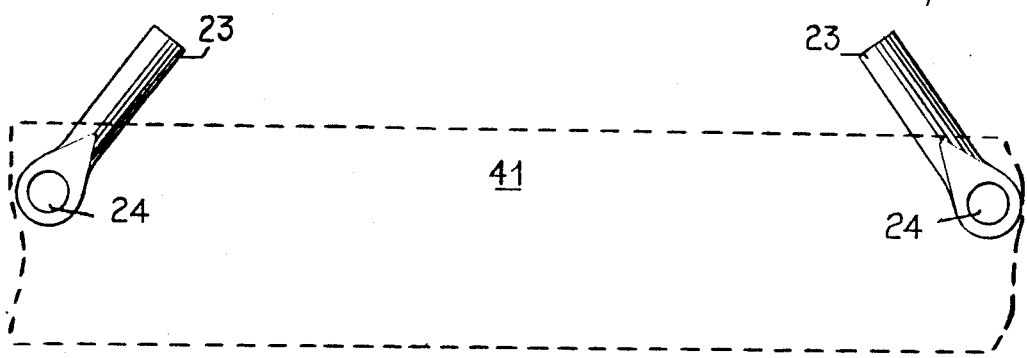

LATCH FOR COMBINATION VENT AND ESCAPE HATCH

BACKGROUND AND SUMMARY OF THE INVENTION

The present invention relates to the field of latches for doors and the like and more particularly to quick release latches for escape doors or hatches such as are used in buses and mobile homes.

In the prior art, Green, U.S. Pat. No. 4,303,572, discloses a latch for an escape door having a mechanism that can be operated to open the door quickly. Green's combination, however, does not provide means for holding the door in a partially open position.

The primary object of the present invention is to provide a latch that can be used not only to secure an escape door or hatch for vehicles such as buses and mobile homes but also to hold such a hatch door partially open so that it can serve as a vent.

The latch comprises two sets of generally opposing rods and cylinders, each having a cylinder that is closed on one end and open on the other and a rod that is slideably engageable with the open end of the cylinder. A first compression spring, fixedly attached to the closed end of the cylinder, is compressed by the rod when it is slideably engaged with the cylinder. The end of the rod distal the cylinder is pivotally connected to a frame for the hatch door. The exterior wall of each cylinder is rigidly secured to one of a pair of brackets. Each bracket has a hole for receiving a pin connected to one of a pair of support pedestals attached to the inside of the hatch door.

When the escape hatch is located in the ceiling of a vehicle, each cylinder is mounted with its closed end directed downwardly when the hatch door is closed. With the cylinder so mounted, the first compression spring simultaneously puts an upward pressure on the rod and supplies a downward force to the support pedestal to hold the hatch door closed. A rubber seal is provided to make the door rain-tight.

The hatch door can also be disposed so as to assume either a vent (partially open) or fully open position. To move the hatch door to the partially open position, a user simply applies a force to the inside of the hatch door. As the hatch door is pushed outwardly, the support pedestal is lifted upwardly, causing the bracket which is pivotally connected thereto to rotate. Simultaneously, the cylinder rotates until the closed end of the clinder abuts against a limiting stop mounted on a support block hingedly connected to the hatch door.

In the vent position, the stop, the cylinder contiguous thereto, and the rod are situated with their longitudinal axes disposed approximately parallel to each other and downwardly at a small angle to the horizontal. The first compression spring then exerts a side force with both lateral and upward components on the stop. To protect the hinge of the hatch door from an unbalanced side force, the limiting stops are disposed with respect to each other in such a way that the lateral components of the forces exerted by the first compression springs in the two cylinders cancel out. The latch according to the present invention is capable of holding the hatch door in a partly open position so that the door can serve as a vent even while the vehicle is moving.

The support block, upon which the stops for the cylinders are mounted, is maintained, except when the hatch door is fully open, in a configuration in which the block is spaced apart a substantial distance from the inside surface of the hatch door. The block is biased to maintain this configuration, when the hatch door is in either the closed or the vent (partially open) position, by a second compression spring. The second compression spring can be used to rotate the block about a pair of hinges connecting it to the hatch door. A foot that projects perpendicularly from the block abuts the hatch door in said configuration and limits the direction in which the block can be rotated.

Each of the stops is mounted on the block proximate the points of attachment of the foot to the block and rearwardly of its leading edge. When a portion of the block away from the stops and the foot is pressed toward the hatch door, the block rotates about the hinge. With the block so rotated, the closed ends of the cylinders miss the stops, allowing the hatch door to be pushed fully open. When the hatch door is opened sufficiently, each of the rods leaves the cylinder with which it has been slideably engaged but remains pivotally attached to the frame of the door. For closure, the hatch door must be pulled toward the frame and each rod reinserted into one of the cylinders.

For external rescue, the hatch is equipped with a release handle or knob that is attached to the block by a flexible chain. When the knob is pulled, the block rotates about the hinge in much the same manner as if the leading edge of the block had been pressed toward the hatch door from the inside of the vehicle, thereby allowing the hatch door to be pulled fully open.

BRIEF DESCRIPTION OF THE DRAWINGS

FIG. 4 is an interior elevational view, on a reduced scale, showing the latch according to FIG. 1 when the hatch door is in the open position; and FIG. 5 is a cross-section 5—5 of FIG. 1, on an enlarged scale, the release handle being shown in solid lines when the release handle has not been activated and in dashed lines when the release handle has been pushed from below or pulled from above.

DETAILED DESCRIPTION OF THE PREFERRED EMBODIMENT

Figure 1:
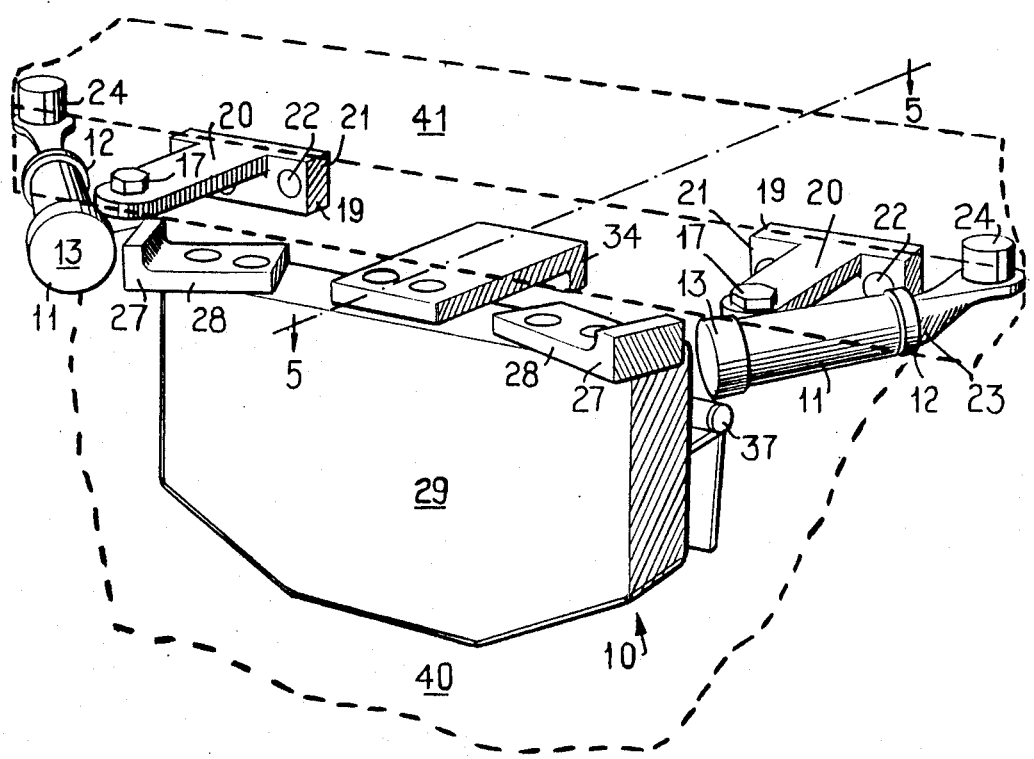
FIG. 1 is an interior perspective view of the latch according to the present invention when the hatch door, indicated by dashed lines, is in the closed position.
Figure 2:
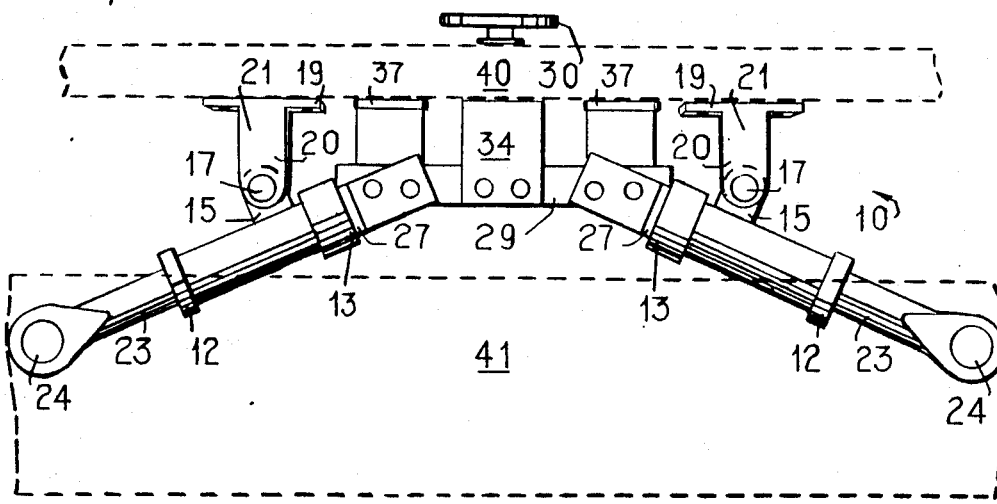
FIG. 2 is an interior elevational view, on a reduced scale, showing the latch according to FIG. 1 when the hatch door is in the vent (partially open) position.

Referring now to the drawings, a latch, indicated generally by the reference numeral 10, is shown in operative association with an escape hatch door 40 secured to a frame 41. The frame 41 is mounted on the wall or ceiling of a bus, mobile home or trailer (not shown).

The latch 10 comprises a hollow cylinder 11 having an open end 12 and a closed end 13. A first compression spring 14, disposed with its longitudinal axis parallel to that of the cylinder 11, is fixedly attached to the closed end 13 of the cylinder 11. The spring 14 is otherwise free to move within the cylinder 11.

On the exterior surface of the cylinder 11 and proximate to its closed end 13, a bracket 15, which is rigidly attached to the cylinder, projects perpendicularly from it. The bracket 15 is pivotally connected to a support pedestal 21 by pin 17. Both the bracket 15 and the pedestal 21 have holes 16 and 18, respectively, formed therein for receiving the pin 17. The pedestal 21, which includes a base 19 and an arm 20, is secured to the hatch door 40 by fasteners 22.

Figure 3:
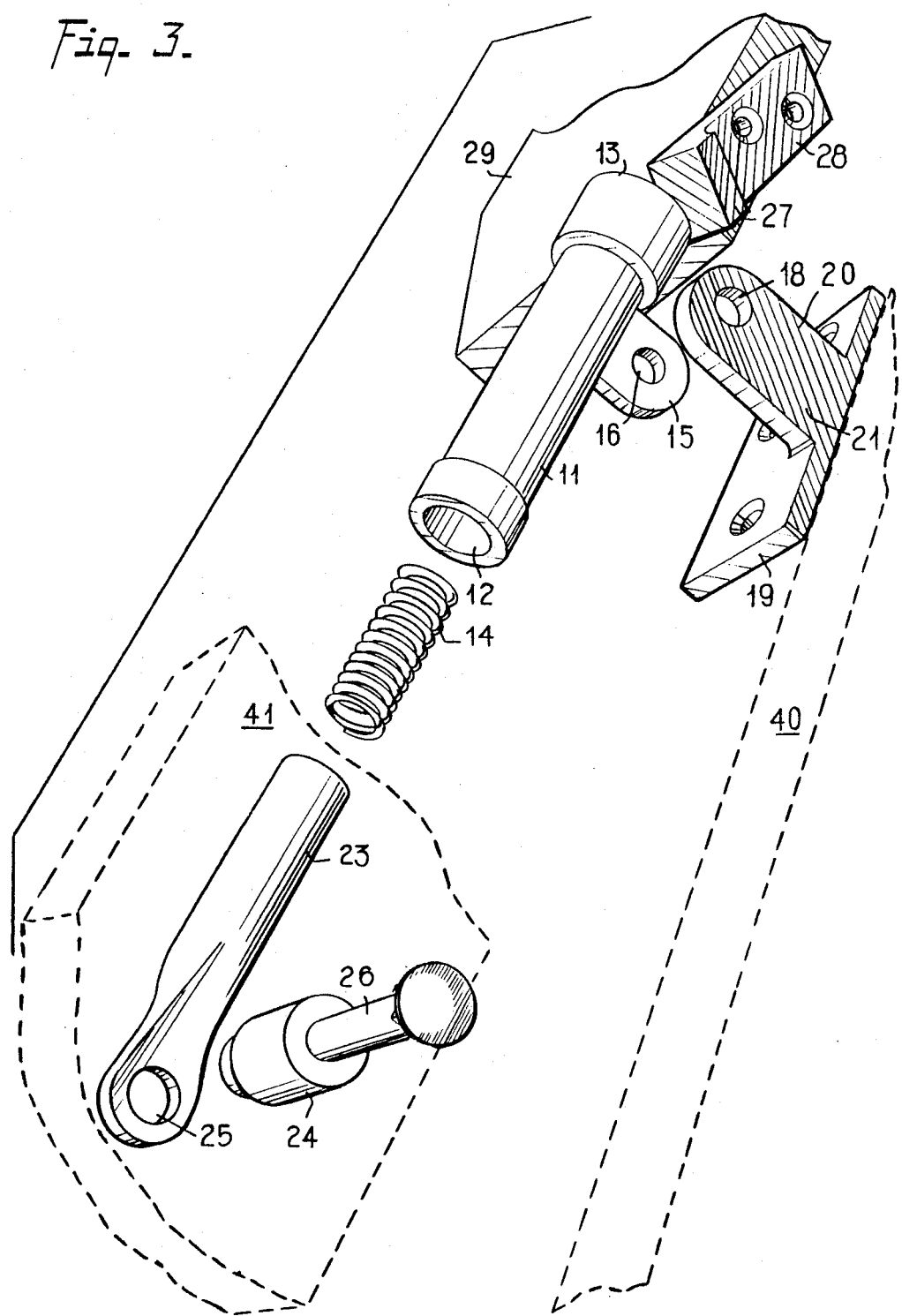
FIG. 3 is an exploded view, on an enlarged scale, showing parts of the latch according to FIG. 1 that are used to secure the hatch door in either the fully closed or vent (partially open) position.

The latch 10 further comprises a rod 23 in slideable engagement with the open end 12 of the cylinder 11. A pin such as a bolt 26 pivotally connects a portion of the rod 23 distal the cylinder 11 to the frame 41. The portion of the rod 23 so connected includes a hole 25 for receiving the bolt 26 (FIG. 3). A spacer 24, from which the bolt 26 extends, is disposed between the frame 41 and the rod 23 to keep the rod 23 from rubbing on the frame.

By simply pushing outwardly on the interior surface of the hatch door 40, a user cam make it move into the vent position. As the door 40 is pushed into the vent position, the closed ends 13 of the cylinders 11 come into contact with the stops 27. Each of the stops 27 includes a mounting base 28 by which the stop is rigidly attached to a support block 29. The teo stops 27 are disposed approximately symmetrically with respect to each other on either side of an imaginary plane which extends perpendicularly from a generally flat surface forming the bulk of the interior of the hatch door 41. In the vent position, the longitudinal axes of the rod 23, the cylinder 11, and the stop 27 are aligned approximately parrallel to each other. The spring 14, pressed by the rod 23, forces the closed end 13 of the cylinder 11 aganist the stop 27, locking the hatch door 40 in a partly open position that is useful for venting.

The support block 29, which is pivotally connected to the hatch door 40 by a pair of hinges 37, is maintained in a stable position in which the stops 27 can make contact with the closed ends 13 of the cylinders 11 by a second compression spring 31. The spring 31, together with a travel limiting foot 34, holds the block 29 in this stable position until the spring 31 is compressed (FIG. 5). When a portion of the block 29 away from the stops 27 and the foot 34 is pressed toward the inside of the hatch door 40, the block 29 rotates so that the stops 27 can no longer engage the closed ends 13 of the cylinders 11. In such an event, the springs 14 within the cylinders 11 expel the rods 23. The hatch door 40 is then free to rotate about a hinge (not shown) connecting the door to the frame 41.

The hatch door 40 may also be opened from the outside. In the latter case, the user pulls outwardly on the release handle or knob 30. The knob 30, preferably incorporated within a protective structure (not shown), protrudes from the hatch door 40 opposite its hinge (not shown).

When the hatch door is in the vent position, the door may be closed simply by pulling it towards the frame 41. Alternately, the door 40 may be opened further to allow emergency egress from the vehicle by pushing on the support block 29 so that the stops 27 move to the side of the closed ends 13 of the cylinders 11, allowing the cylinders to continue their upward rotation about the pins 17 unimpeded (FIG. 4).

It is apparent from the foregoing that a new and improved latch for hatches and vents has been provided. While only the presently preferred embodiment of the invention has been disclosed, as will be apparent to those familiar with the art, certain changes and modifications can be made without departing from the scope of the invention as defined by the following claims.

What is claimed is:

1. A latch adapted for operative association with a frame and a hatch door that is hinged to the frame so that the door can be opened outwardly, comprising:
   (a) at least one support pedestal secured to the inside surface of the hatch door;
   (b) at least one hollow cylinder open at one end and closed at the other end and pivotally connected to the pedestal;
   (c) a first compression spring disposed within the cylinder;
   (d) a rod that is slideably engageable with the cylinder, the rod being pivotally connected to the frame;
   (e) means, including at least one stop connected to the hatch door, for limiting the rotation of the cylinder about its pivotal connection with the pedestal, the cylinder rotating about said pivotal connection as the hatch door is being opened initially, the first compression spring being compressed by the rod both when the hatch door is closed and when the cylinder abuts the stop, the spring forcing the cylinder against the stop and holding the hatch door in the partly opened position so that an opening formed between the hatch door and the frame can be used for a vent; and
   (g) means for moving the stop out of the path of the cylinder to allow the hatch door to be fully opened.

2. A latch according to claim 1 wherein the means for moving the stop out of the path of the cylinder further comprises:
   (a) a support block on which the stop is mounted;
   (b) at least one hinge connecting the support block to the hatch door; and
   (c) means for biasing the support block so that the stop, otherwise maintained at a substantial distance from the inside surface of the hatch door, can be moved with the support block as it is rotated toward the door, thereby allowing the cylinder to pivot past the stop and disengage from the rod when the hatch door is opened sufficiently.

3. A latch according to claim 2 wherein the means for moving the stop out of the path of the cylinder further comprises:
   (a) a handle disposed above the outside surface of the hatch door; and
   (b) means connected to the handle for pulling the support block towards the inside surface of the hatch door, so that the stop can be moved out of the path of the cylinder by simply pulling on the handle.

4. A latch according to claim 3 which further comprises a pair of stops, wherein the support block is further characterized as having an elongated, approximately straight edge, and wherein each of the stops is further characterized as having a generally flat contact face, an imaginary line extending perpendicularly to said face being disposed at a small angle to said edge; the contact faces of the two stops being disposed approximately symmetrically about a plane that is disposed perpendicular to said straight edge.

5. A latch adapted for operative association with a frame and a hatch door that is hinged to the frame so that the door can be opened outwardly, comprising:
   (a) at least one support pedestal secured to the inside surface of the hatch door;

(b) at least one hollow cylinder open at one end and closed at the other end and pivotally connected to the pedestal;
(c) a first compression spring disposed within the cylinder;
(d) a rod that is slideably engageable with and removable from the cylinder, the rod being pivotally connected to the frame;
(e) means, including at least one stop connected to the hatch door, for limiting the rotation of the cylinder about its pivotal connection with the pedestal, the cylinder rotating about said pivotal connection as the hatch door is being opened initially, the first compression spring being compressed by the rod both when the hatch door is closed and when the cylinder abuts the stop, the spring being forced by the cylinder against the stop and holding the hatch door in the partly opened position so that an opening formed between the hatch door and the frame can be used for a vent; and
(g) means for disengaging the rod from the cylinder in which the energy stored in the first compression spring when it is compressed by the rod can be utilized to aid in opening the hatch door from its closed position.

6. A latch according to claim 5 wherein the means for disengaging the rod further comprises:
(a) a support block on which the stop is mounted, the block being hingedly connected to the hatch door; and
(b) means for biasing the support block so that the stop, otherwise maintained a substantial distance from the inside surface of the hatch door, can be moved with the support block toward the door, thereby allowing the cylinder to pivot about the support pedestal and past the stop.

* * * * *